United States Patent
Yoneda et al.

(10) Patent No.: US 8,164,851 B2
(45) Date of Patent: Apr. 24, 2012

(54) BASE UNIT FOR USE IN STORAGE DISK DRIVE APPARATUS, SPINDLE MOTOR INCLUDING THE BASE UNIT, AND STORAGE DISK DRIVE APPARATUS INCLUDING THE SPINDLE MOTOR

(75) Inventors: Tomohiro Yoneda, Kyoto (JP); Takatoki Sugi, Kyoto (JP); Hiroshi Kobayashi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/239,497

(22) Filed: Sep. 22, 2011

(65) Prior Publication Data
US 2012/0075746 A1    Mar. 29, 2012

(30) Foreign Application Priority Data
Sep. 29, 2010    (JP) .................................. 2010-219366

(51) Int. Cl.
*G11B 25/04*    (2006.01)
(52) U.S. Cl. .................................................... 360/99.08
(58) Field of Classification Search ................. 360/99.08
See application file for complete search history.

(56) References Cited

U.S. PATENT DOCUMENTS

| | | | |
|---|---|---|---|
| 5,946,161 A * | 8/1999 | Schuh | 360/97.15 |
| 7,122,922 B2 * | 10/2006 | Xu et al. | 310/51 |
| 7,518,823 B2 * | 4/2009 | Albrecht et al. | 360/99.08 |
| 7,684,146 B1 * | 3/2010 | Andrikowich et al. | 360/99.21 |
| 2005/0206255 A1 | 9/2005 | Yoshino et al. | |
| 2006/0023339 A1 | 2/2006 | Fukuyama et al. | |

FOREIGN PATENT DOCUMENTS

| | | |
|---|---|---|
| JP | 07-334967 A | 12/1995 |
| JP | 2000-209804 A | 7/2000 |
| JP | 2005-210787 A | 8/2005 |
| JP | 2006-040423 A | 2/2006 |

* cited by examiner

*Primary Examiner* — Mark Blouin
(74) *Attorney, Agent, or Firm* — Keating & Bennett, LLP (57) ABSTRACT

A base unit for use in a storage disk drive apparatus includes a base portion; a stator core including a plurality of teeth; U-phase, V-phase, and W-phase coils; U-phase, V-phase, and W-phase common wires; and a circuit board. The U-phase, V-phase, and W-phase coils are wound on the teeth and arranged to define a U phase, a V phase, and a W phase, respectively. The U-phase, V-phase, and W-phase common wires are arranged to define the U phase, the V phase, and the W phase, respectively. Each of the U-phase, V-phase, and W-phase common wires is arranged to pass through a separate one of through holes to be drawn out beyond a lower surface of the base portion and electrically connected to the circuit board. Each of the through holes is sealed with a sealant such that the base unit is airtight.

15 Claims, 5 Drawing Sheets

BASE UNIT FOR USE IN STORAGE DISK DRIVE APPARATUS, SPINDLE MOTOR INCLUDING THE BASE UNIT, AND STORAGE DISK DRIVE APPARATUS INCLUDING THE SPINDLE MOTOR

BACKGROUND OF THE INVENTION

1. Field of the Invention

The present invention relates to a base unit, and more specifically to a base unit for use in a storage disk drive apparatus, a spindle motor including the base unit, and a storage disk drive apparatus including the spindle motor.

2. Description of the Related Art

JP-A 2006-40423 describes a known hard disk drive apparatus. This known hard disk drive apparatus includes a magnetic disk, a head arranged to write and read data to or from the magnetic disk, and a case arranged to contain the magnetic disk and a driving portion arranged to drive the head.

The magnetic disk includes a plurality of concentric tracks. Each of the tracks includes data areas in which data is stored, and servo areas in which servo data is stored. Data is written to or read from the magnetic disk while the position of the magnetic head is identified using the servo data with the magnetic disk being rotated.

Regarding hard disk drive apparatuses in recent years, there has been a push towards smaller track intervals and hence greater track densities in order to achieve higher capacities. There is a need for the servo data, which is used to control positioning of the head, to be recorded with higher precision in order to achieve smaller track intervals.

Accordingly, JP-A 2006-40423 discloses a technique of trapping a gas (e.g., helium, hydrogen, or the like) having a smaller density than that of air in the case of a hard disk drive. This technique enables the servo data to be recorded with higher precision while reducing oscillation, irregular rotation, etc., of the magnetic disk, that is, while reducing so-called "flutter" of the magnetic disk.

When a user uses the hard disk drive apparatus with helium or the like trapped in the case thereof, the rotational resistance of the magnetic disk is reduced because of reduced flutter of the magnetic disk, which makes it possible to reduce a required electrical current value of a motor used to rotate the magnetic disk.

In a spindle motor installed in the hard disk drive apparatus as described above, lead wires drawn from coils of different phases of the motor are intertwined together. Common wires intertwined together into a single stranded wire are passed through a through hole defined in the case and drawn out of a base. The common wires drawn out of the base are connected to a circuit board through a solder below the through hole. The through hole is sealed with the solder, an adhesive on the circuit board, and so on.

The structure as described above, however, may not be able to prevent the gas such as helium or the like inside the case from leaking out of the hard disk drive apparatus, leading to deterioration in the purity of the gas trapped in the case of the hard disk drive over the life of the hard disk drive apparatus.

SUMMARY OF THE INVENTION

A base unit for use in a storage disk drive apparatus according to a preferred embodiment of the present invention preferably includes a base portion arranged to extend radially outwardly around a central axis; a stator core including an annular core back and a plurality of teeth; U-phase, V-phase, and W-phase coils; U-phase, V-phase, and W-phase common wires; and a circuit board. A gas having a smaller density than that of air is trapped within the storage disk drive apparatus. The base portion is arranged to extend radially outwardly around the central axis. The teeth are arranged to project either radially outwardly or radially inwardly from the core back. The U-phase, V-phase, and W-phase coils are wound around the teeth and arranged to provide a U phase, a V phase, and a W phase, respectively. The U-phase, V-phase, and W-phase common wires are arranged to define the U phase, the V phase, and the W phase, respectively. The circuit board is preferably arranged on an axially lower surface of the base portion. Each of the U-phase, V-phase, and W-phase common wires is arranged to pass through a separate one of through holes to be drawn out beyond the lower surface of the base portion and electrically connected to the circuit board. Each of the through holes is sealed with a sealant.

In the base unit according to a preferred embodiment of the present invention, each of the U-phase, V-phase, and W-phase common wires is preferably arranged to pass through a separate one of the through holes of the base portion, and each of the through holes is sealed with the sealant such that each of the through holes possesses an airtight seal. A gas inside the base unit is thereby prevented from leaking out through any of the through holes.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. Note that the preferred embodiments described below are only meant to be illustrative of the present invention, and should not be construed to restrict the scope of the present invention, applications thereof, or intended purposes thereof.

Figure 1:
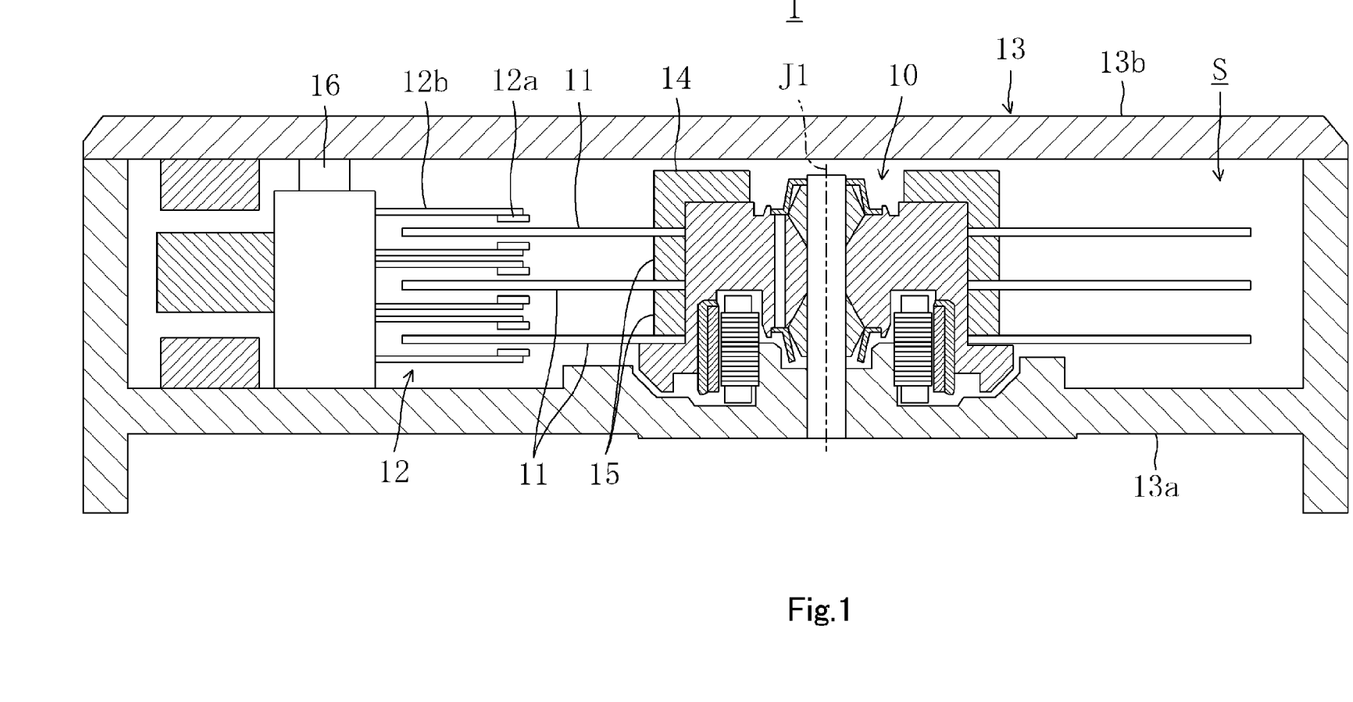
FIG. 1 is a vertical cross-sectional view illustrating the structure of a hard disk drive apparatus including a spindle motor according to a first preferred embodiment of the present invention.

FIG. 1 is a vertical cross-sectional view illustrating the structure of a hard disk drive apparatus 1 including an electric spindle motor 10 according to a first preferred embodiment of the present invention. As illustrated in FIG. 1, the hard disk drive apparatus 1 preferably includes disc-shaped storage disks 11 on which information is recorded, an access portion 12, the electric spindle motor 10 (hereinafter referred to as the "motor 10"), and a housing 13. The access portion 12 is arranged to perform reading and/or writing of information from or to the storage disks 11. The motor 10 is arranged to rotate the storage disks 11. The housing 13 is arranged to contain the storage disks 11, the access portion 12, and the motor 10. The motor 10 is preferably a three-phase brushless motor, but any other desirable type of motor could be used.

It is assumed herein that an axially upper side and an axially lower side along a central axis J1 in the accompanying figures are referred to as an "upper side" and a "lower side", respectively. Also note that directional terms, such as "upward", "above", "downward", "below", "left", "right", etc., as used in the description of the preferred embodiments of the present invention to describe relative positions or directions of different members or portions are simply used with reference to the accompanying drawings, and should not be construed as describing relative positions or directions of those members or portions when actually installed in a device.

The housing 13 preferably includes a first housing member 13a and a second housing member 13b. The second housing member 13b preferably is in the shape of a flat plate, and is arranged to cover an opening of the first housing member 13a. The first housing member 13a includes the opening defined in an upper side thereof. The motor 10 and the access portion 12 are attached to an inner bottom surface of the first housing member 13a. An interior space S of the housing 13 is arranged to be a clean space with no, or an extremely small amount, of dirt and/or dust. A gas having a density smaller than that of air is trapped in the interior space S. An example of such a gas is, for example, helium, however, any other gas that has a density smaller than that of air could be used instead.

The storage disks 11 are mounted above the motor 10, and preferably supported by the motor 10 through a clamper 14 and annular spacers 15.

The access portion 12 includes magnetic heads 12a, arms 12b arranged to support the magnetic heads 12a, and a head actuator mechanism 16. Each of the magnetic heads 12a is arranged to magnetically perform reading and/or writing of information from or to a corresponding one of the storage disks 11 while being arranged in close proximity to the storage disk 11. The head actuator mechanism 16 is arranged to move each of the arms 12b to move an associated one of the magnetic heads 12a relative to a corresponding one of the storage disks 11 and the motor 10. Each magnetic head 12a is thereby arranged to access a specified location on a corresponding one of the rotating storage disks 11 while being arranged in close proximity to the storage disk 11 to perform the reading and/or writing of information.

Figure 2:
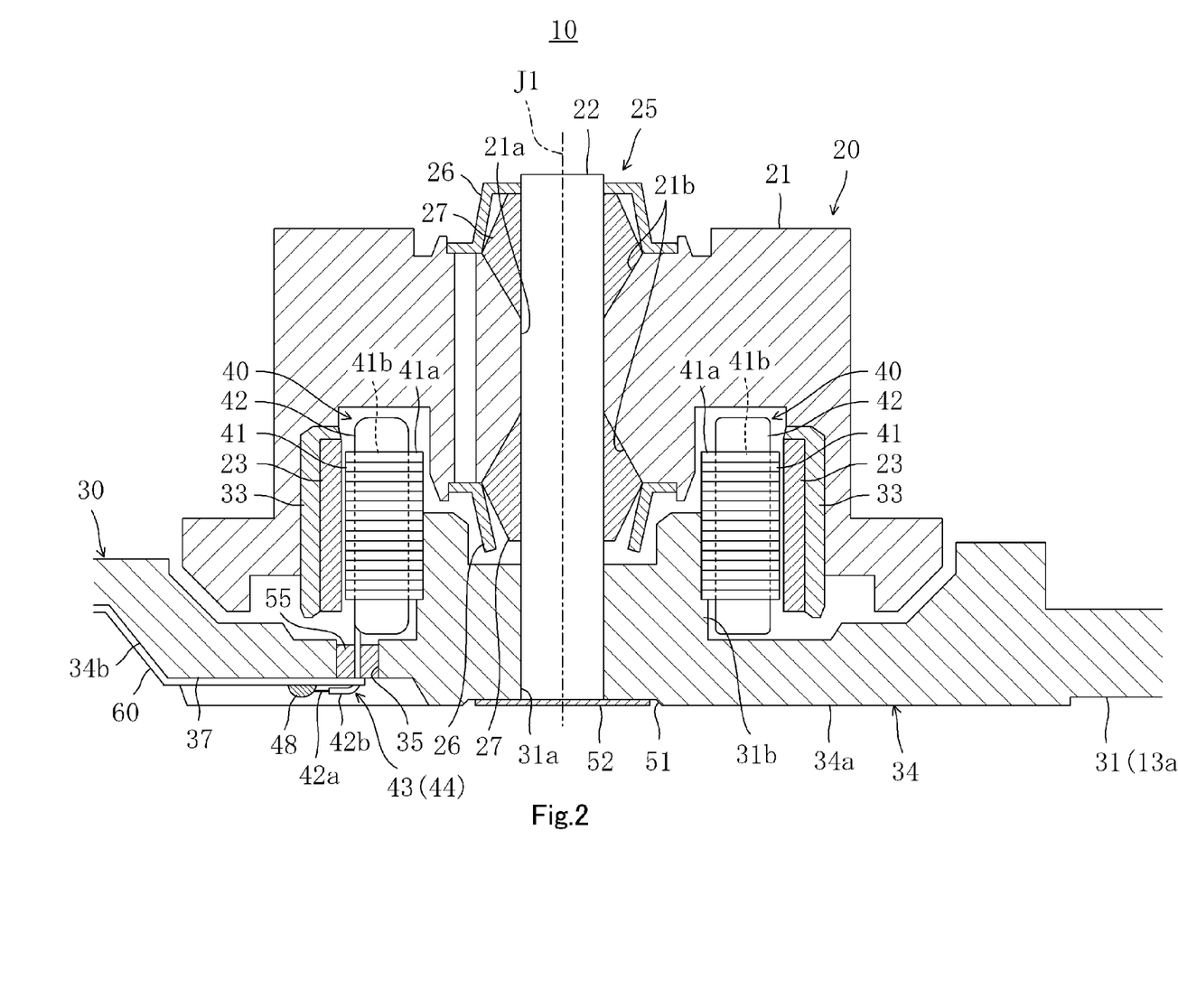
FIG. 2 is a vertical cross-sectional view illustrating the structure of the spindle motor according to the first preferred embodiment of the present invention.

FIG. 2 is a vertical cross-sectional view illustrating the structure of the spindle motor 10. The motor 10 is preferably an outer-rotor motor. The motor 10 preferably includes a rotor portion 20, a stator portion 30 defining a portion of a base unit, and a fluid dynamic pressure bearing mechanism 25 containing a fluid.

The rotor portion 20 preferably includes a rotor hub 21, a cylindrically shaped metallic yoke 33, and a rotor magnet 23. The yoke 33 is preferably attached to an inside surface of the rotor hub 21. The rotor magnet 23 is preferably attached to an inside surface of the yoke 33, and is arranged to encircle the central axis J1. The rotor hub 21 preferably includes a shaft hole 21a defined in a center thereof. A shaft 22 of the bearing mechanism 25 is inserted through the shaft hole 21a. Opening portions provided within the rotor portion 20 above and below the shaft hole 21a preferably include tapered inclined portions 21b which are arranged to gradually increase in inside diameter with increasing distance from the shaft hole 21a.

The rotor portion 20 is supported to be rotatable about the central axis J1 of the shaft 22 with respect to the stator portion 30.

The rotor magnet 23 is an annular magnet with multiple magnetic poles and, together with a stator 40, is arranged to generate a torque centered on the central axis J1.

The stator portion 30 preferably includes a base plate 31, the stator 40, and a plate 52. The base plate 31 includes a hole portion 31a defined in a center thereof. The stator 40 is attached to a holder 31b arranged to extend upward around the hole portion 31a. The plate 52 is arranged below a lower surface of the base plate 31 to thereby close the hole portion 31a.

The base plate 31 is preferably made of, for example, an aluminum alloy or the like, and defines a portion of the housing 13 of the hard disk drive apparatus 1 in which the motor 10 is installed. A surface of the base plate 31 is preferably coated with an electrodeposition coating layer. The electrodeposition coating layer preferably has a thickness on the order of, for example, several micrometers, and ensures electrical insulation. Mechanisms including the access portion (see FIG. 1) and so on are attached onto the base plate 31. The shaft 22 of the bearing mechanism 25 is inserted in the hole portion 31a, and fixed thereto through, for example, press fitting and adhesion, or the like.

The stator 40 includes a stator core 41 preferably defined by, for example, laminated silicon steel sheets. The stator core 41 includes an annular core back 41a and a plurality of teeth 41b arranged to project radially outwardly from the core back 41a. Nine slots are preferably defined between the teeth 41b such that the slots are spaced from one another in a circumferential direction of the core back 41a. However, any other desirable number of slots could be used is so desired. In addition, the stator 40 includes coils 42 each of which is preferably wound on a separate one of the teeth 41b of the stator core 41.

The coils 42 wound on the teeth 41b preferably include U-phase coils defining a U phase, V-phase coils defining a V phase, and W-phase coils defining a W phase. Three lead wires 43 (for the W, V, and U phases, respectively) and three common wires 44 (for the W, V, and U phases, respectively) are drawn from the coils 42 of the respective phases. Each pair of adjacent ones of the teeth 41b have one of the slots defined therebetween, and each of the lead wires 43 and the common wires 44 of the W, V, and U phases, respectively, is drawn out through a separate one of the slots.

A lower portion of the base plate 31 includes a shoulder portion 51 recessed upward. The plate 52 is arranged inside the shoulder portion 51. The plate 52 is fixed through, for example, an adhesive or the like to close a lower opening end of the hole portion 31a.

The bearing mechanism 25 includes annular seal members 26 attached to upper and lower opening portions of the rotor hub 21. An annular member 27 including an angled surface arranged opposite to the inclined portion 21b of the rotor hub 21 is arranged between each seal member 26 and the inclined portion 21b. In addition, a gap defined between the shaft 22 and the shaft hole 21a of the rotor hub 21, and a gap defined between the shaft 22 and each seal member 26, are filled with a lubricating oil which acts as a bearing fluid. While the motor 10 is rotated, a minute gap is defined between each annular member 27 and a corresponding one of the inclined portions 21b of the rotor hub 21. A fluid dynamic pressure is generated in this minute gap, with the lubricating oil serving as a working fluid of the bearing.

The rotor hub 21 is thus supported through the lubricating oil in a non-contact manner with respect to the shaft 22. The rotor portion 20 and the storage disks 11 attached to the rotor portion 20 are thus arranged to rotate with respect to the stator portion 30.

Figure 3:
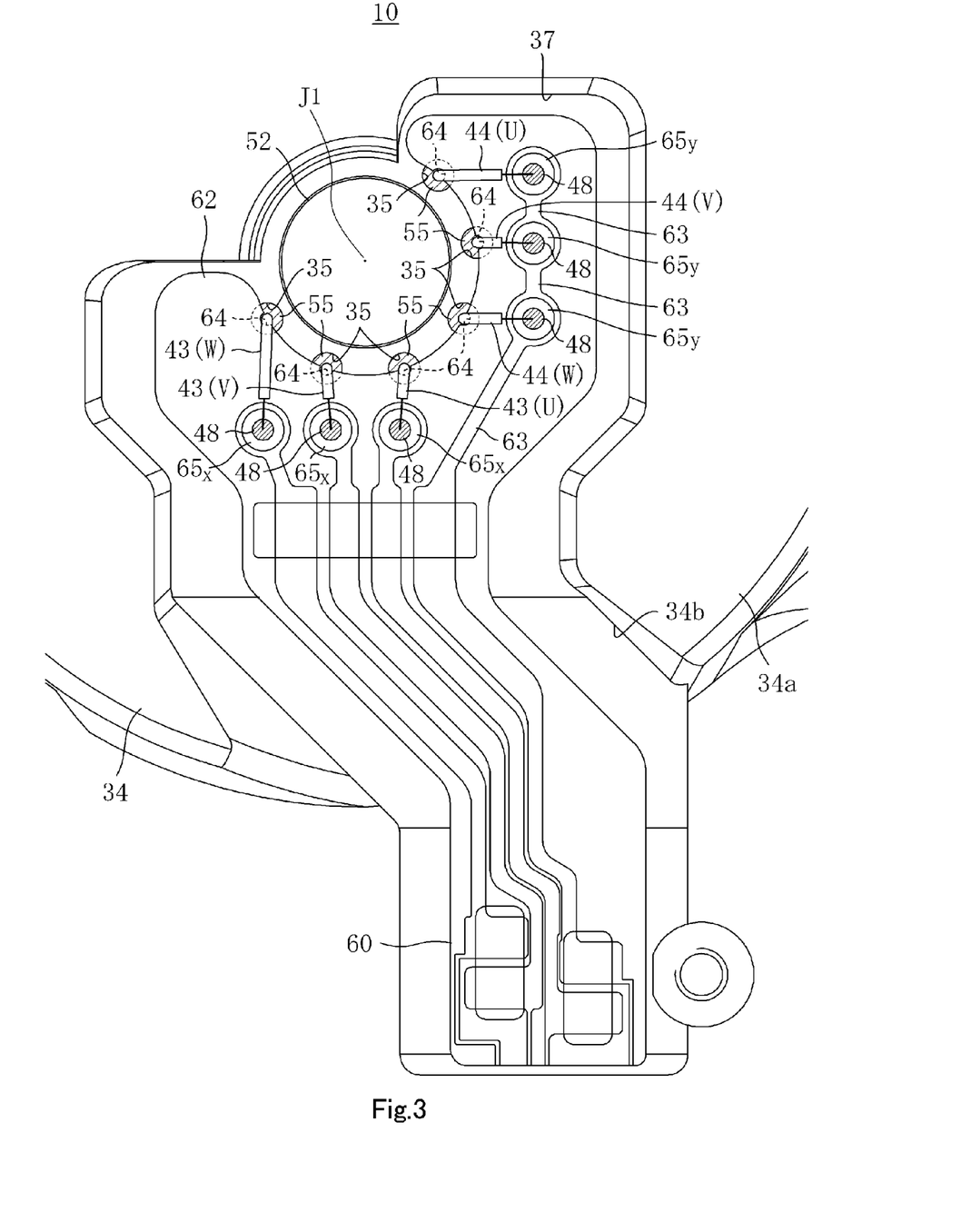
FIG. 3 is a bottom view illustrating the structure of the spindle motor according to the first preferred embodiment of the present invention.

Referring to FIG. 3, the lower surface of the base plate 31 preferably includes a base portion 34 having an increased thickness and arranged to extend radially outwardly around the central axis J1. The base portion 34 preferably includes, for example, six through holes 35 defined therein, each of which is arranged to extend through the base portion 34 from an upper surface to a lower surface thereof. The six through holes 35 correspond to the three lead wires 43 (for the W, V, and U phases, respectively) and the three common wires 44 (for the W, V, and U phases, respectively) drawn from the coils 42 of the stator 40. Each of the through holes 35 has only one of the lead wires 43 or the common wires 44 passing therethrough.

The base portion 34 preferably includes a bottom portion 34a, which includes the through holes 35, and a side wall portion 34b arranged to extend upward from an outer circumferential portion of the bottom portion 34a. The bottom portion 34a includes an accommodating portion 37 recessed upward and arranged to extend from a vicinity of the central axis J1 radially outwardly beyond the through holes 35.

A flexible circuit board 60 (hereinafter referred to as the "circuit board 60") is arranged in the accommodating portion 37. More precisely, three lead wire pad portions 65x of the circuit board 60, which are used to establish an electrical connection with the lead wires 43 from the coils 42, are arranged in the accommodating portion 37. In addition, at least one common wire pad portion 65y of the circuit board 60, which is used to establish an electrical connection with the common wires 44 from the coils 42, is arranged in the accommodating portion 37. The circuit board 60 preferably includes three such lead wire pad portions 65x corresponding to the lead wires 43 of the W, V, and U phases, respectively, and three such common wire pad portions 65y corresponding to the common wires 44 of the W, V, and U phases, respectively.

The circuit board 60 preferably includes an insulating layer 62 and a conductive layer 63. The conductive layer 63 is covered with the insulating layer 62. Portions of the conductive layer 63 are exposed from the insulating layer 62 to define the lead wire pad portions 65x, which are electrically connected with the lead wires 43. Portions of the conductive layer 63 are exposed from the insulating layer 62 to define the common wire pad portions 65y, which are electrically connected with the common wires 44. The circuit board 60 is arranged along the side wall portion 34b and the lower surface of the base plate 31. The lead wire pad portions 65x and the common wire pad portions 65y are arranged radially outwardly of the through holes 35 in the accommodating portion 37. The circuit board 60 is stuck on the base plate 31, preferably through an adhesive layer arranged on an upper surface of the insulating layer 62. The insulating layer 62 is made, for example, of polyimide or the like. The conductive layer 63 is preferably made, for example, of copper foil or other suitable material.

A portion of the insulating layer 62 which is located on a side of the lead wire pad portions 65x and the common wire pad portions 65y where the through holes 35 are arranged includes groove portions 64 each of which are recessed in a radial direction. Each of the groove portions 64 is arranged to overlap in an axial direction with a separate one of the through holes 35. Each of the lead wires 43 drawn out through the through holes 35 is brought into contact with a corresponding one of the groove portions 64 and is bent toward a corresponding one of the lead wire pad portions 65x. Each of the common wires drawn out through the through holes 35 is brought into contact with a corresponding one of the groove portions 64 and bent toward a corresponding one of the common wire pad portions 65y. Each lead wire 43 is guided by the corresponding groove portion 64 toward the corresponding lead wire pad portion 65x. Each common wire 44 is guided by the corresponding groove portion 64 toward the corresponding common wire pad portion 65y. Moreover, each of the lead wires 43 and the common wires 44 is prevented from coming into contact with a lower opening end of a corresponding one of the through holes 35.

Each of the coils 42 of the stator 40 includes a conducting wire 42a and an insulating coating 42b with which the conducting wire 42a is coated. A tip portion of each of the lead wires 43 and the common wires 44 from the coils 42 is not coated with the insulating coating 42b, so that the conducting wire 42a is exposed thereat. Because a contact of each of the lead wires and the common wires 44 with the lower opening end of the corresponding through hole 35 is prevented, a contact of the insulating coating 42b with an edge of the lower opening end is prevented, thereby leading to a decreased probability of the insulating coating 42b coming off and to prevention of insulation failure of the coil 42.

Each of the lead wires 43 of the W, V, and U phases, respectively, is soldered to a corresponding one of the lead wire pad portions 65x.

The common wire pad portions 65y, which are connected with the common wires 44 of the W, V, and U phases, respectively, are electrically connected with one another through the conductive layer 63. Therefore, when the common wires 44 of the W, V, and U phases, respectively, have been soldered to the corresponding common wire pad portions 65y, a neutral point is defined with the common wires 44 electrically connected with one another.

Referring to FIG. 2, the axial recessed depth of the accommodating portion 37 is arranged to be greater than the sum of the thickness of the circuit board 60 and the thickness of a solder 48. A top of the solder 48 is thereby prevented from projecting from the lower surface of the base portion 34.

Each of the through holes 35 is sealed with a sealant 55. The sealant 55 is preferably, for example, a thermosetting adhesive, and is arranged to fix the lead wire 43 or the common wire 44 in the through hole 35 so that the lead wire 43 or the common wire 44 may not move therein. Note that a variety of other adhesives than the thermosetting adhesive may also be used as the sealant 55, if so desired. Examples of such other adhesives include an Ultra Violet curing adhesive. Also note that sealants that are not adhesives may also be used as long as an airtight seal can be achieved thereby. For example, a sealant that is not an adhesive and which is in a liquid or gel state when applied may be used so long as it will produce an airtight seal when cured.

If the common wires 44 of the W, V, and U phases, respectively, were intertwined together into a single stranded wire, gaps might occur between the common wires 44. However, when each of the common wires 44 of the W, V, and U phases, respectively, is passed through a separate one of the through holes 35 as in the present preferred embodiment, such gaps do not occur.

The circuit board 60 is preferably arranged in a portion of the accommodating portion 37 which is located radially outwardly of the through holes 35. Therefore, when each through hole 35 is sealed with the sealant 55, the circuit board 60 does not interfere with the sealing of the through hole 35 with the sealant 55. Moreover, secure sealing of the through hole 35 with the sealant 55 is achieved to ensure airtightness. This contributes to preventing a gas or the like from entering or exiting the housing 13 of the hard disk drive apparatus 1 through any through hole 35. In particular, it contributes to preventing a gas or the like inside the housing 13 of the hard disk drive apparatus 1 from leaking out through any through hole 35. In the present preferred embodiment, helium, which has a smaller molecular weight than that of air, is arranged inside the housing 13. This helium is prevented from leaking out through any through hole 35 due to the airtight seals provided in each through hole 35.

Next, a procedure for electrically connecting the lead wires 43 and the common wires 44 of the W, V, and U phases, respectively, of the stator 40 to the circuit board 60 will now be described below with reference to FIGS. 2 and 3.

First, the circuit board 60 is attached to the lower surface of the base plate 31, preferably through, for example, an adhesive. Then, each of the lead wires 43 and the common wires 44 of the W, V, and U phases, respectively, is passed through a separate one of the slots and a separate one of the through holes 35 of the base plate 31. Because each of the lead wires 43 and the common wires 44 of the W, V, and U phases, respectively, is drawn out through a separate one of the slots, an operator is able to easily discriminate among the lead wires and the common wires 44 of the W, V, and U phases, respectively. This leads to an improvement in efficiency in an operation of soldering each of the lead wires 43 to a predetermined one of the lead wire pad portions 65$x$, and also to an improvement in efficiency in an operation of soldering each of the common wires 44 to a predetermined one of the common wire pad portions 65$y$.

Note that two or more of the lead wires 43 and the common wires 44 may be passed through the same slot before each of the lead wires 43 and the common wires 44 is passed through a separate one of the through holes 35 of the base plate 31.

At this time, the stator 40 is fixed to the holder 31$b$ of the base plate 31 preferably through, for example, press fitting or other suitable method. Each of the lead wires 43 of the W, V, and U phases, respectively, as drawn out beyond the lower surface of the base portion 34 is brought into contact with the corresponding groove portion 64 of the circuit board 60 and bent toward the corresponding lead wire pad portion 65$x$. Each of the common wires 44 of the W, V, and U phases, respectively, as drawn out beyond the lower surface of the base portion 34 is brought into contact with the corresponding groove portion 64 of the circuit board 60 and bent toward the corresponding common wire pad portion 65$y$. Then, the conducting wire 42$a$ exposed at the tip portion of each lead wire 43 is soldered to the corresponding lead wire pad portion 65$x$. The conducting wire 42$a$ exposed at the tip portion of each common wire 44 is soldered to the corresponding common wire pad portion 65$y$.

Then, the adhesive is applied to an inside of each through hole 35, and heat is applied to the adhesive to harden the adhesive. The hardened adhesives contribute to an improvement in airtightness of the housing 13. In addition, the hardened adhesives cause the positions of the lead wires 43 within the corresponding through holes 35 to be fixed. An operation of arranging the lead wires 43 and the common wires 44 of the W, V, and U phases, respectively, is thereby completed.

Figure 4:
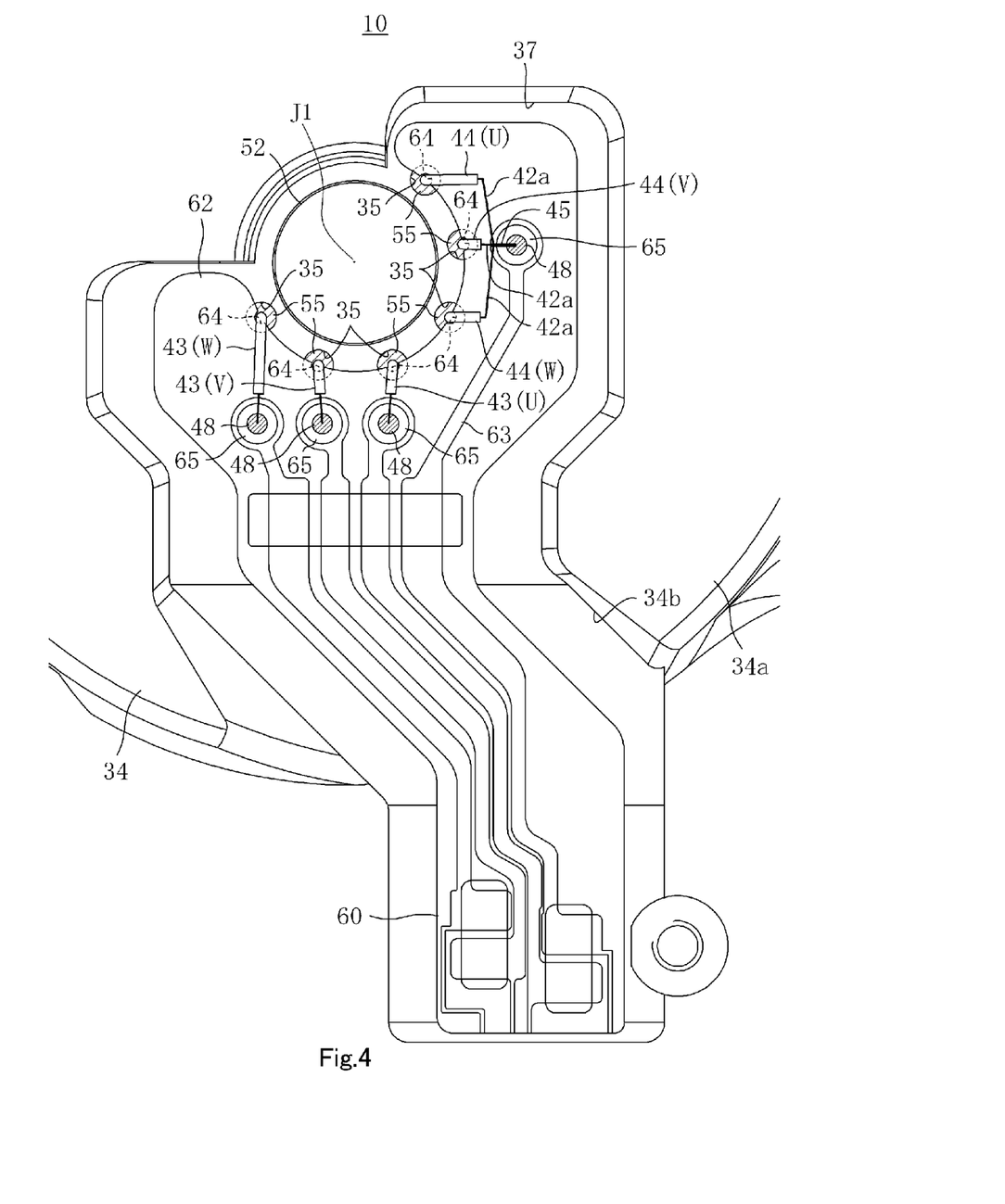
FIG. 4 is a bottom view illustrating the structure of a spindle motor according to a second preferred embodiment of the present invention.

FIG. 4 is a bottom view illustrating the structure of a spindle motor according to a second preferred embodiment of the present invention. The basic structure of the spindle motor according to the second preferred embodiment preferably is similar to that of the spindle motor according to the first preferred embodiment. Accordingly, members or portions that have their equivalents in the first preferred embodiment are denoted by the same reference numerals as those of their equivalents in the first preferred embodiment, and only differences from the first preferred embodiment will be described below.

Referring to FIG. 4, the common wires 44 of the W, V, and U phases, respectively, as drawn out through the corresponding through holes 35 are intertwined together into a single stranded wire 45 outside of the base portion 34. More specifically, the conducting wires 42$a$ exposed at the tip portions of the common wires 44 and uncoated with the insulating coatings 42$b$ are intertwined together into the single stranded wire 45. This single stranded wire 45 defines the neutral point with each of the common wires 44 of the W, V, and U phases, respectively, electrically connected with one another. The circuit board 60 includes a total of four pad portions 65, which are used for the lead wires 43 of the W, V, and U phases and the single stranded wire 45, respectively. The conducting wire 42$a$ exposed at the tip portion of each of the lead wires 43 of the W, V, and U phases and the single stranded wire 45 is soldered to a corresponding one of the pad portions 65 of the circuit board 60, and thereby electrically connected to the circuit board 60.

In the case where each of the common wires 44 of the W, V, and U phases, respectively, is passed through a separate one of the through holes 35 before the common wires 44 of the W, V, and U phases, respectively, are intertwined together outside of the base portion 34 as described above, the aforementioned gaps between the common wires 44 do not occur. In addition, each of the through holes 35 is securely sealed with the sealant 55 to ensure airtightness of an inside of the base unit.

Figure 5:
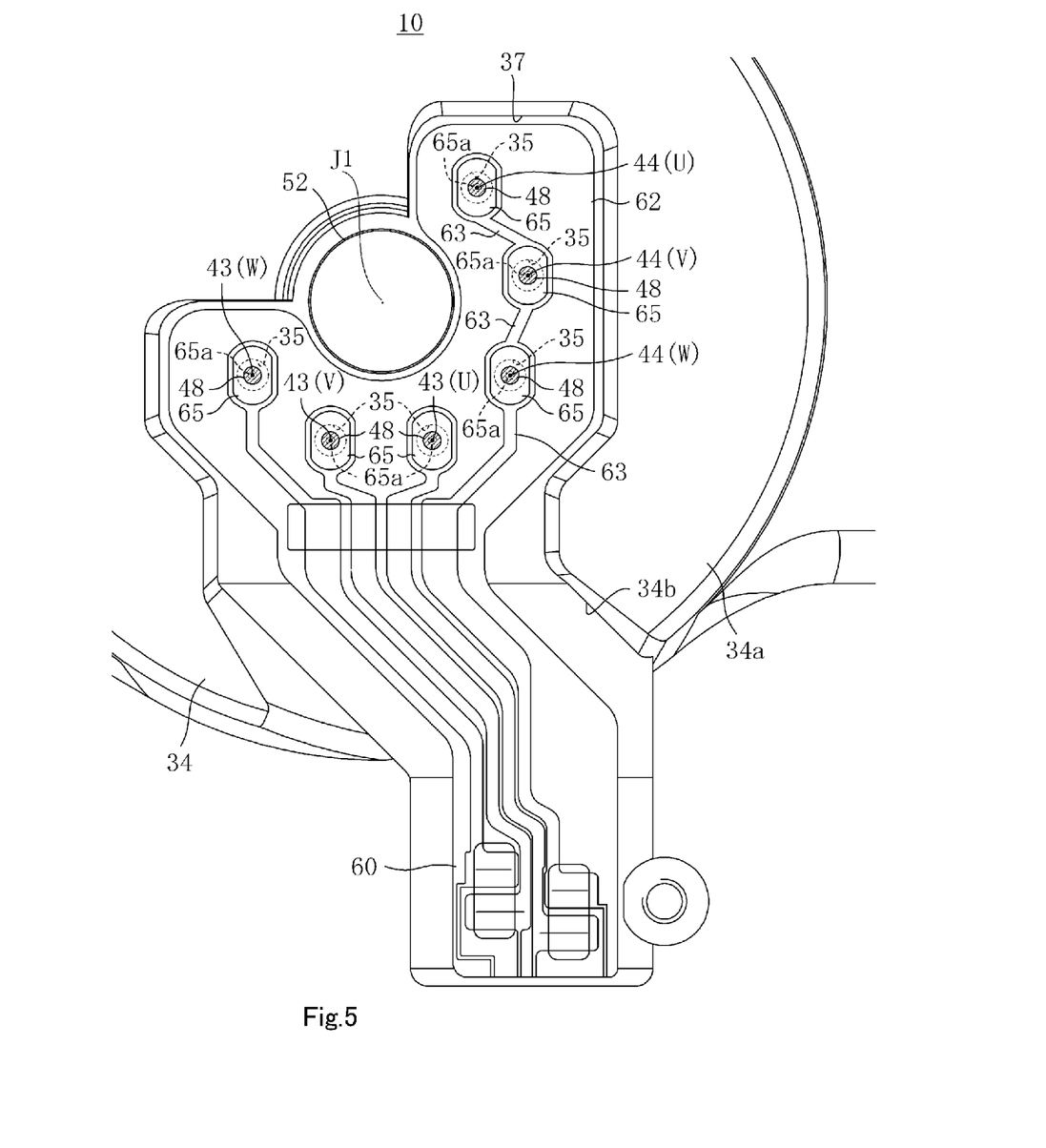
FIG. 5 is a bottom view illustrating the structure of a spindle motor according to a third preferred embodiment of the present invention.

FIG. 5 is a bottom view illustrating the structure of a spindle motor according to a third preferred embodiment of the present invention. The basic structure of the spindle motor according to the third preferred embodiment is similar to that of the spindle motor according to the first preferred embodiment. Accordingly, members or portions that have their equivalents in the first preferred embodiment are denoted by the same reference numerals as those of their equivalents in the first preferred embodiment, and only differences from the first preferred embodiment will be described below.

Referring to FIG. 5, each of the pad portions 65 of the circuit board 60 includes a pad hole 65$a$ arranged to overlap in the axial direction with a separate one of the through holes 35. The circuit board 60 is arranged in the accommodating portion 37 such that the pad holes 65$a$ and the through holes 35 are arranged to overlap in the axial direction with each other. Each pad hole 65$a$ is smaller in size than each through hole 35. The circuit board 60 is stuck on the base plate 31 preferably through, for example, the adhesive layer arranged on the upper surface of the insulating layer 62. Each of the lead wires 43 and the common wires 44 of the W, V, and U phases, respectively, is passed through a separate one of the pad holes 65$a$ to reach a lower surface of a corresponding one of the pad portions 65, and soldered thereto below the corresponding pad portion 65 and thereby electrically connected to the circuit board 60. Those of the pad portions 65 which are connected with the common wires 44 of the W, V, and U phases, respectively, are electrically connected with one another through the conductive layer 63. Therefore, when the common wires 44 of the W, V, and U phases, respectively, have been soldered to the corresponding pad portions 65, the neutral point is defined with the common wires 44 electrically connected with one another. An area surrounding the lower opening end of each through hole 35 is preferably covered with the adhesive layer of the circuit board 60. The pad hole 65$a$ arranged below each through hole 35 is closed by the solder 48. Because each through hole 35 is sealed with the circuit board 60 and the solder 48 as described above, the airtightness of the inside of the base unit is ensured.

While the spindle motors according to preferred embodiments of the present invention have been described above, the present invention is not limited to the above-described preferred embodiments, and it is to be understood by those skilled in the art that variations and modifications can be made without departing from the scope and spirit of the present invention.

For example, while the base plate 31 and the housing 13 are preferably defined integrally with each other as being a single monolithic member in each of the above-described preferred embodiments, the base plate 31 and the housing 13 may be defined by separate members in accordance with other preferred embodiments of the present invention.

Also, while the spindle motor 10 preferably is an outer-rotor motor in each of the above-described preferred embodiments, the spindle motor 10 may also be an inner-rotor motor in other preferred embodiments of the present invention. Furthermore, the bearing mechanism 25 of the motor 10 is not limited to a bearing mechanism that utilizes fluid dynamic pressure, but other types of plain bearings or bearings having other structures, such as, for example, ball bearings, air bearings, etc., may be used in other preferred embodiments of the present invention.

Furthermore, the circuit board 60 is not limited to the flexible circuit board, but a variety of other circuit boards may be used as the circuit board 60 in other preferred embodiments of the present invention. For example, a rigid board, such as a beard including a connector, may be used.

As is apparent from the foregoing description, various preferred embodiments of the present invention, pertaining to a base unit for use in a storage disk drive apparatus, are able to achieve a highly practical effect of improved airtightness, and therefore have considerable utility and high industrial applicability.

Also, the disk drive apparatus according to the present invention is not limited to a hard disk drive apparatus, but storage disk drive apparatus may be used in other preferred embodiments of the present invention.

Only selected preferred embodiments have been chosen to illustrate the present invention. To those skilled in the art, however, it will be apparent from the foregoing disclosure that various changes and modifications can be made herein without departing from the scope of the present invention as defined in the appended claims. Furthermore, the foregoing description of the preferred embodiments according to the present invention is provided for illustration only, and not for limiting the invention as defined by the appended claims and their equivalents.

What is claimed is:

1. A base unit for use in a storage disk drive apparatus in which a gas having a smaller density than that of air is trapped, the base unit comprising:
    a base portion arranged to extend radially outwardly around a central axis, and including a plurality of through holes defined therein, and a hole portion defined in a center thereof;
    a plate arranged below a lower surface of the base portion to close the hole portion;
    a stator core arranged above the base portion, and including an annular core back and a plurality of teeth arranged to project either radially outwardly or radially inwardly from the core back;
    U-phase coils, V-phase coils, and W-phase coils wound on the teeth and arranged to define a U phase, a V phase, and a W phase, respectively;
    a U-phase common wire, a V-phase common wire, and a W-phase common wire drawn out from the U-phase, V-phase, and W-phase coils, respectively; and
    a circuit board arranged on the lower surface of the base portion, and including at least one common wire pad portion and three lead wire pad portions arranged to be connected with the U-phase, V-phase, and W-phase coils, respectively; wherein
    each of the U-phase, V-phase, and W-phase common wires is arranged to pass through a separate one of the through holes to be drawn out beyond the lower surface of the base portion;
    each of the U-phase, V-phase, and W-phase common wires is electrically connected to a corresponding one of the at least one common wire pad portion of the circuit board through a solder; and
    each of the through holes is sealed with a sealant such that the base unit is airtight or substantially airtight.

2. The base unit according to claim 1, wherein end portions of the U-phase, V-phase, and W-phase common wires are electrically connected to the at least one common wire pad portion of the circuit board to define a neutral point.

3. The base unit according to claim 1, wherein the lead wire pad portions and the at least one common wire pad portion of the circuit board are arranged radially outwardly of the through holes.

4. The base unit according to claim 1, wherein each of the U-phase, V-phase, and W-phase common wires is drawn out through a separate circumferential gap defined between adjacent ones of the teeth of the stator core.

5. The base unit according to claim 1, wherein the three through holes through which the U-phase, V-phase, and W-phase common wires, respectively, are arranged to pass are arranged radially outwardly of the plate.

6. The base unit according to claim 1, wherein
    the lead wire pad portions are arranged in a straight line or substantially in a straight line; and
    the at least one common wire pad portion includes plural common wire pad portions, and the common wire pad portions are arranged to be perpendicular or substantially perpendicular to the central axis and the lead wire pad portions.

7. The base unit according to claim 1, wherein
    the base portion includes a bottom portion including the plurality of through holes;
    the bottom portion includes an accommodating portion recessed upward and arranged to extend from a vicinity of the central axis radially outwardly beyond the plurality of through holes; and
    a depth of recession of the accommodating portion is arranged to be greater than a sum of a thickness of the circuit board and a thickness of the solder.

8. The base unit according to claim 1, wherein the sealant includes an adhesive or solder.

9. The base unit according to claim 1, wherein the circuit board includes three groove portions each of which is arranged to contact and guide a separate one of the U-phase, V-phase, and W-phase common wires drawn out through the through holes toward the corresponding one of the at least one common wire pad portion.

10. The base unit according to claim 1, wherein
    end portions of the U-phase, V-phase, and W-phase common wires are intertwined together below the base portion into a single stranded wire to define a neutral point; and
    the single stranded wire is electrically connected to the at least one common wire pad portion of the circuit board.

11. The base unit according to claim 1, wherein the plurality of through holes are arranged on a circle centered on the central axis.

12. The base unit according to claim 11, wherein a middle one of the three through holes through which the U-phase, V-phase, and W-phase common wires, respectively, are arranged to pass is closer to the at least one common wire pad portion than the other two through holes.

13. A spindle motor for use in a storage disk drive apparatus, the spindle motor comprising:
the base unit of claim 1;
a rotor hub arranged above the base portion, and arranged to be rotatable about the central axis; and
a rotor magnet fixed to the rotor hub, and arranged radially opposite the stator core with a gap therebetween.

14. A storage disk drive apparatus comprising:
the spindle motor of claim 13;
a storage disk attached to the rotor hub of the spindle motor;
an access portion arranged to read and/or write information from or to the storage disk; and
a housing including a first housing member and a second housing member, and arranged to contain the spindle motor and the access portion, the first housing member including the base portion.

15. The base unit according to claim 1, wherein the gas having a smaller density than that of air is helium.

* * * * *